(12) United States Patent
Ausen et al.

(10) Patent No.: US 7,968,172 B2
(45) Date of Patent: Jun. 28, 2011

(54) COEXTRUDED PROFILED WEBS

(75) Inventors: Ronald W. Ausen, St. Paul, MN (US);
Janet A. Venne, Roseville, MN (US);
Jayshree Seth, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/696,354

(22) Filed: Jan. 29, 2010

(65) Prior Publication Data

US 2010/0136297 A1    Jun. 3, 2010

Related U.S. Application Data

(62) Division of application No. 10/863,717, filed on Jun. 8, 2004, now Pat. No. 7,678,316.

(51) Int. Cl.
*B32B 3/28* (2006.01)
(52) U.S. Cl. ......... 428/174; 428/172; 428/182; 428/213
(58) Field of Classification Search .................. 428/172, 428/182, 184, 213, 174
See application file for complete search history.

(56) References Cited

U.S. PATENT DOCUMENTS

| | | | |
|---|---|---|---|
| 3,387,069 A | 6/1968 | Stohr | |
| 3,397,428 A | 8/1968 | Donald | |
| 3,398,431 A | 8/1968 | Corbett | |
| 3,448,183 A | 6/1969 | Chisholm | |
| 3,485,912 A | 12/1969 | Schrenk et al. | |
| 3,594,870 A | 7/1971 | Schippers et al. | |
| 3,756,758 A | 9/1973 | Prall | |
| 3,807,918 A | 4/1974 | Chill et al. | |
| 3,890,083 A | 6/1975 | St. Eve | |
| 3,920,365 A | 11/1975 | Mules | |
| 3,932,090 A | 1/1976 | Brumlik | |
| 4,001,366 A | 1/1977 | Brumlik | |
| 4,083,914 A * | 4/1978 | Schippers et al. ............ 264/147 |
| 4,189,809 A | 2/1980 | Sotos | |
| 4,197,069 A | 4/1980 | Cloeren | |
| 4,285,100 A | 8/1981 | Schwarz | |
| 4,368,565 A | 1/1983 | Schwarz | |
| 4,426,344 A | 1/1984 | Dinter et al. | |
| 4,435,141 A | 3/1984 | Weisner et al. | |
| 4,492,549 A | 1/1985 | Rasmussen et al. | |

(Continued)

FOREIGN PATENT DOCUMENTS

DE    1 660 230    4/1971

(Continued)

OTHER PUBLICATIONS

International Search Report, PCT/US2005/015831, Aug. 19, 2005, 5 pages.

(Continued)

*Primary Examiner* — Donald Loney
(74) *Attorney, Agent, or Firm* — Kathleen B. Gross

(57) ABSTRACT

A nonplanar, thermoplastic polymeric film having a top surface, a bottom surface, a midline, and a series of peaks and valleys oscillating around the midline and forming continuous ridges in a first direction on both the top surface and the bottom surface of the film. The nonplanar, thermoplastic polymeric film has two or more polymer layers with at least one polymer layer partitioned disproportionally in the peaks such that at least two of the two or more polymer layers vary in thickness across the width of the nonplanar, thermoplastic polymeric film.

14 Claims, 13 Drawing Sheets

U.S. PATENT DOCUMENTS

| | | | |
|---|---|---|---|
| 4,533,510 A | 8/1985 | Nissel | |
| 4,536,362 A | 8/1985 | Donaldson et al. | |
| 4,551,369 A | 11/1985 | Belz | |
| 4,636,419 A | 1/1987 | Madsen et al. | |
| 4,732,723 A | 3/1988 | Madsen et al. | |
| 4,755,247 A | 7/1988 | Mudge | |
| 4,787,897 A | 11/1988 | Torimae et al. | |
| 4,806,289 A | 2/1989 | Laursen et al. | |
| 4,842,794 A | 6/1989 | Hovis et al. | |
| 4,871,487 A | 10/1989 | Laursen et al. | |
| 4,882,185 A | 11/1989 | Simelunas et al. | |
| 5,078,942 A | 1/1992 | Sullivan et al. | |
| 5,120,484 A | 6/1992 | Cloeren | |
| 5,162,074 A | 11/1992 | Hills | |
| 5,173,141 A | 12/1992 | Leseman et al. | |
| 5,209,282 A | 5/1993 | Franco et al. | |
| 5,256,052 A | 10/1993 | Cloeren | |
| 5,344,691 A | 9/1994 | Hanschen et al. | |
| 5,354,597 A | 10/1994 | Capik et al. | |
| 5,429,856 A | 7/1995 | Krueger et al. | |
| 5,462,708 A | 10/1995 | Swenson et al. | |
| 5,468,428 A | 11/1995 | Hanschen et al. | |
| 5,501,675 A | 3/1996 | Erskine | |
| 5,686,128 A | 11/1997 | Tracy et al. | |
| 5,840,412 A | 11/1998 | Wood et al. | |
| 5,879,602 A | 3/1999 | Scheuring | |
| 5,891,549 A | 4/1999 | Beretta et al. | |
| 5,976,665 A | 11/1999 | Hansson | |
| 6,221,483 B1 | 4/2001 | Hilston et al. | |
| 6,245,401 B1 | 6/2001 | Ying et al. | |
| 6,398,535 B1 | 6/2002 | Cloeren | |
| 6,413,595 B1 | 7/2002 | Schirmer | |
| 6,511,742 B1 | 1/2003 | Mussig et al. | |
| 6,565,347 B1 | 5/2003 | Linkies et al. | |
| 6,669,887 B2 | 12/2003 | Hilston et al. | |
| 6,767,492 B2 | 7/2004 | Norquist et al. | |
| 6,837,698 B2 | 1/2005 | Floyd et al. | |
| 7,048,984 B2 | 5/2006 | Seth et al. | |
| 7,182,992 B2 | 2/2007 | Ausen et al. | |
| 7,241,483 B2 | 7/2007 | Ausen et al. | |
| 7,678,316 B2 | 3/2010 | Ausen et al. | |
| 2002/0127293 A1 | 9/2002 | Bentley et al. | |
| 2002/0179007 A1 | 12/2002 | Burkett et al. | |
| 2003/0203155 A1* | 10/2003 | Kobe et al. | 428/119 |
| 2005/0003151 A1 | 1/2005 | Jacoby | |
| 2005/0060849 A1 | 3/2005 | Vanbenschoten et al. | |
| 2006/0147686 A1 | 7/2006 | Ausen et al. | |
| 2007/0154683 A1 | 7/2007 | Ausen et al. | |

FOREIGN PATENT DOCUMENTS

| | | |
|---|---|---|
| DE | 295 14 350 | 11/1995 |
| DE | 29514350 * | 11/1995 |
| DE | 201 04 988 | 10/2001 |
| EP | 0 160 857 | 4/1985 |
| EP | 0 353 064 B1 | 1/1997 |
| JP | 6-293067 | 10/1994 |
| JP | 8-187113 | 7/1996 |

OTHER PUBLICATIONS

Written Opinion of the International Searching Authority, PCT/US2005/015831, Aug. 19, 2005, 7 pages.

* cited by examiner

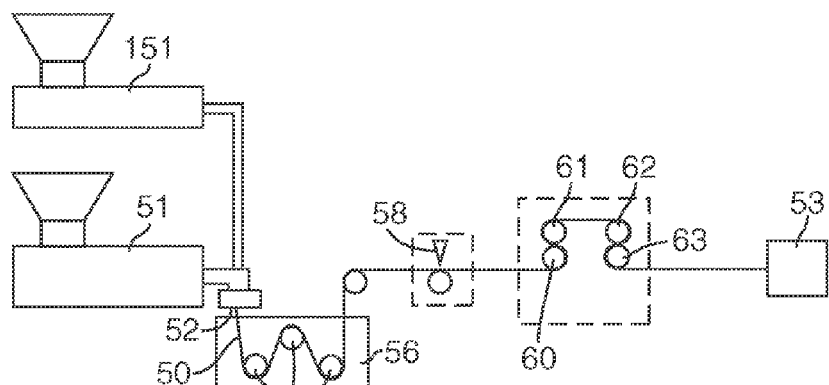
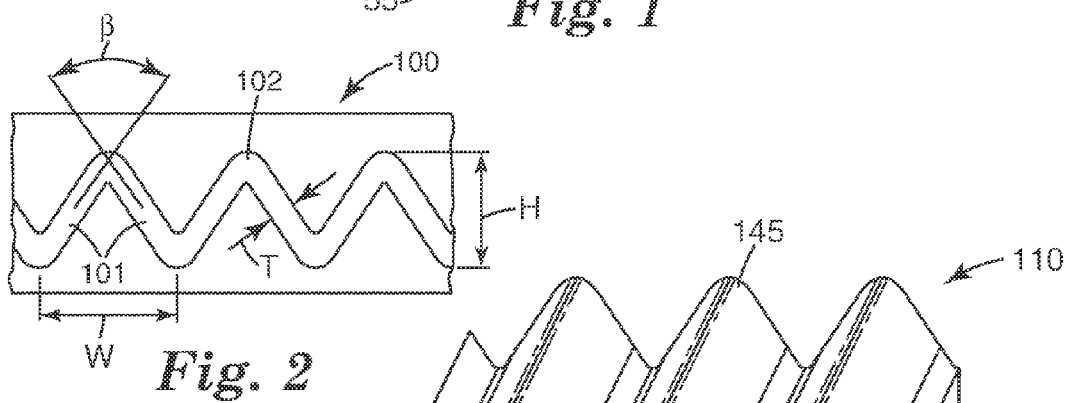
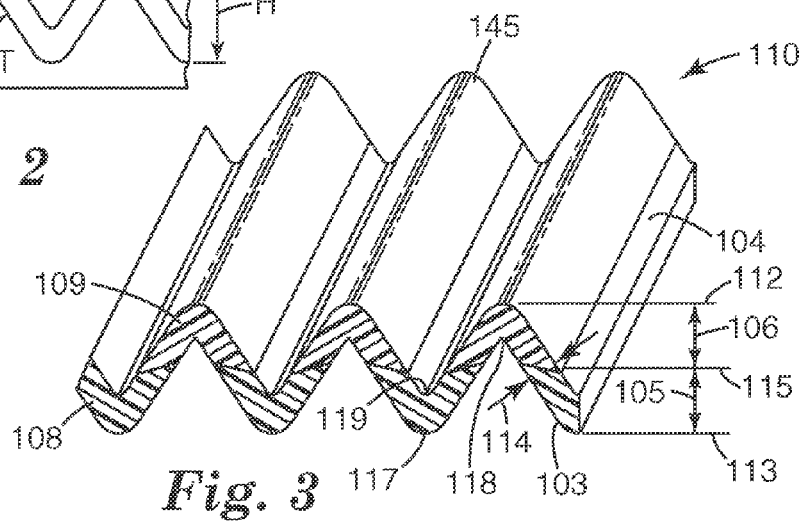
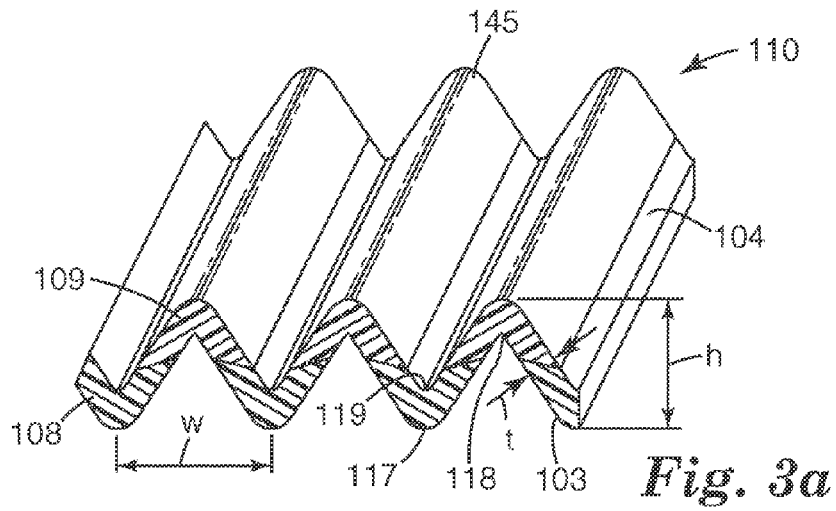

COEXTRUDED PROFILED WEBS

CROSS REFERENCE TO RELATED APPLICATIONS

This application is a divisional of U.S. Ser. No. 10/863,717, filed Jun. 8, 2004 now U.S. Pat. No. 7,678,316, now allowed, the disclosure of which is incorporated by reference in its entirety herein.

BACKGROUND OF THE INVENTION

Coextrusion of multiple polymeric components into a single layer cast film is relatively common in the art. Often, multiple polymeric flow streams are combined in a die or feedblock in a layered fashion to provide a top to bottom multilayer film. The diverse polymer flowstreams are typically combined in a feedblock section or the like and then flow in a layered configuration into a conventional coat hanger die arrangement, where the flowstreams flatten out into a film-like flowstream and are extruded onto a casting roll or the like. This arrangement creates films where the polymers form into layers in the thickness dimension.

Alternatively, it is also proposed to provide more complicated coextruded film structures where the layers are partitioned not as coextensive layers in the thickness direction but partitioned along the width of the film. An example is where the polymers are partitioned in a side-by-side configuration or variations thereof to provide discrete included zones of a first polymer within a continuous matrix of a second polymer. U.S. Pat. No. 4,426,344 describes a complicated feedblock method which takes two coextruded melt streams initially arranged in the thickness direction, with a zig-zag interface, and redirects the top to bottom layered polymer flows into a side-by-side arrangement resulting in a film having a sinusoidal or zig-zag interface, with different zones in the width direction. Although the two halves were indicated as being formed of identical materials it is conceivable that different materials could be employed in the two halves though this is not specifically taught.

Japanese Kokai No. 8-187113 discloses the possibility of side-by-side coextrusion although a specific method for achieving this is not specifically disclosed. U.S. Pat. No. 6,221,483 also discloses a side-by-side coextrusion of an elastic material and an inelastic material for use in a diaper fastening tab. The elastic materials are intermittently spaced by inelastic material. The side-by-side arrangement is achieved by using an insert in a conventional two layer slot die which blocks off alternating lanes of the elastic and inelastic materials coming from the two slots and brings them together in an alternating fashion. This method requires that extreme pressure be applied to prevent leakage of the respective materials due to their differences in melt flow. The two materials would still tend to flow laterally in the die once they pass the insert. U.S. Pat. No. 4,787,897 also discloses a side-by-side arrangement of multiple layers, although in this case three zones are disclosed. There are two outer inelastic zones with a single inner elastic zone. The inner elastic zone is created somehow by coalescence of a single elastic melt stream in a die, but it is unclear how this is done. U.S. Pat. No. 5,429,856 discloses the possibility of creating discrete elastic strands or zones within an inelastic matrix by an inclusion coextrusion technique using a Cloeren-type three layer die feeding discrete strands of elastic into the center melt stream with two inelastic outer layers sandwiching the discrete elastic flowstreams.

All the above described methods describe methods for forming films. Anything other than simple multiple layers in the thickness dimension such as side-by-side layering or more complex layer arrangements, are created by modifications of either of the feedblock or the die wherein polymer melt flows are diverted or redirected or the like. These approaches are somewhat problematic in an enclosed die or feedblock. They require that melt streams of different polymeric materials be exposed to complex nonlinear flow patterns within the body of the die or manifold. This can result in complex flow interactions and problems with residue build up and the need for routine disassembling and cleaning. Also different materials do not generally combine in a predictable manner as the flow characteristics of the polymers in the die or manifold are not always the same. When the materials are combined, complex flow interactions occur between the convergence zones for the polymers and the extruder die lip resulting in films other than those specifically desired. The present invention addresses some of these problems by providing for side-by-side type relative layering in extruded films by altering the discrete thermoplastic resin streams in a film extrudate immediately at the die lip.

BRIEF DESCRIPTION OF THE INVENTION

The present invention is directed at a coextruded polymer film with varying polymer zones in the width or cross-section direction formed from a profile extruded film. The profile extruded film is three dimensional and has a first face and a second face. The polymer film is coextruded from a conventional multilayer or multi-component die and then the flow is partitioned at the die face by a profiled die plate having a profiled opening oscillating from an upper region to a lower region on either side of a center line. The film is characterized by two or more side-by-side zones with different polymers or relative proportions of polymers and is nonplanar. Generally, at any given plane of the nonplanar film, the polymer or relative proportions of polymer in that plane will be substantially identical when the oscillating structure is substantially regular.

The preferred method generally includes coextruding two or more thermoplastic resin streams through the profiled die plate, which die plate is shaped to form a nonplanar film (three dimensional) preferably with a regularly oscillating peak and valley structure that oscillates from a top surface to a bottom surface forming longitudinally extending ridges on both faces of the film. The film is formed by coextruding the film through the oscillating die plate opening causing partitioning of the resins in different zones in the width direction of the film. Flattening of the film results in a film with side-by-side zones formed of different polymers or relative proportions of polymers.

BRIEF DESCRIPTION OF THE DRAWINGS

The present invention will be further described with reference to the accompanying drawings wherein like reference numerals refer to like parts in the several views, and wherein:

FIG. 1 is a schematic view of a method of forming the invention film.

FIG. 2 is a cross-sectional view of a die plate used to form a precursor film used in accordance with the present invention.

FIG. 3 is a perspective view of a precursor film used in accordance with the present invention.

FIG. 3a is a perspective view of a precursor film used in accordance with the present invention.

DETAILED DESCRIPTION OF THE PREFERRED EMBODIMENT

Figure 4:
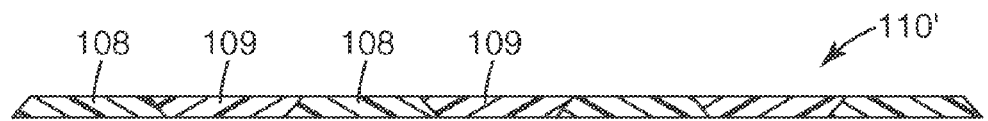
FIG. 4 is a cross-sectional view of the FIG. 3 film flattened to a planar form.
Figure 5:
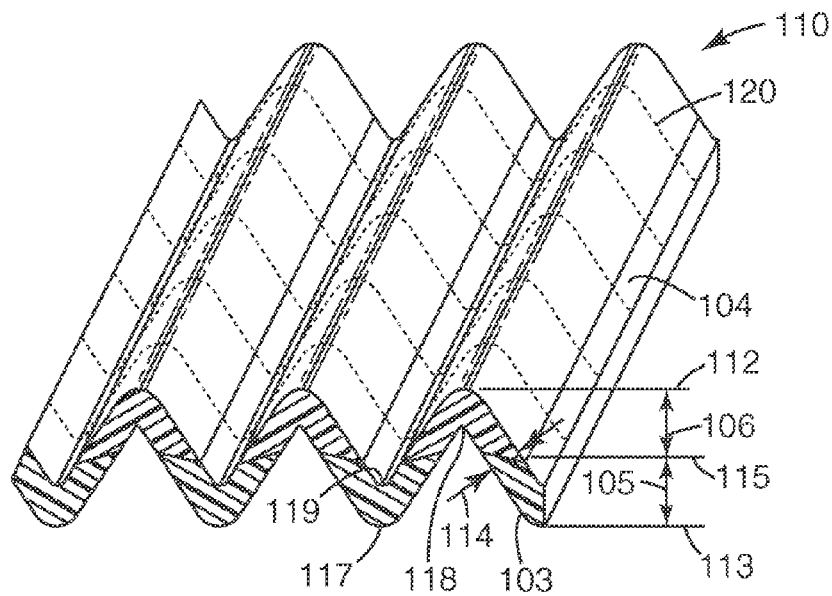
FIGS. 5 and 6 are perspective views of the FIG. 3 film cut on one face at regular intervals in oscillating form and flattened form.
Figure 11:
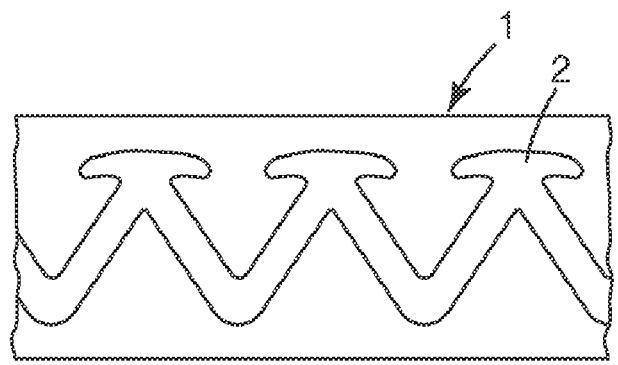
FIG. 11 is a cross-sectional view of a die plate used to form a precursor film used in accordance with the present invention.
Figure 14:
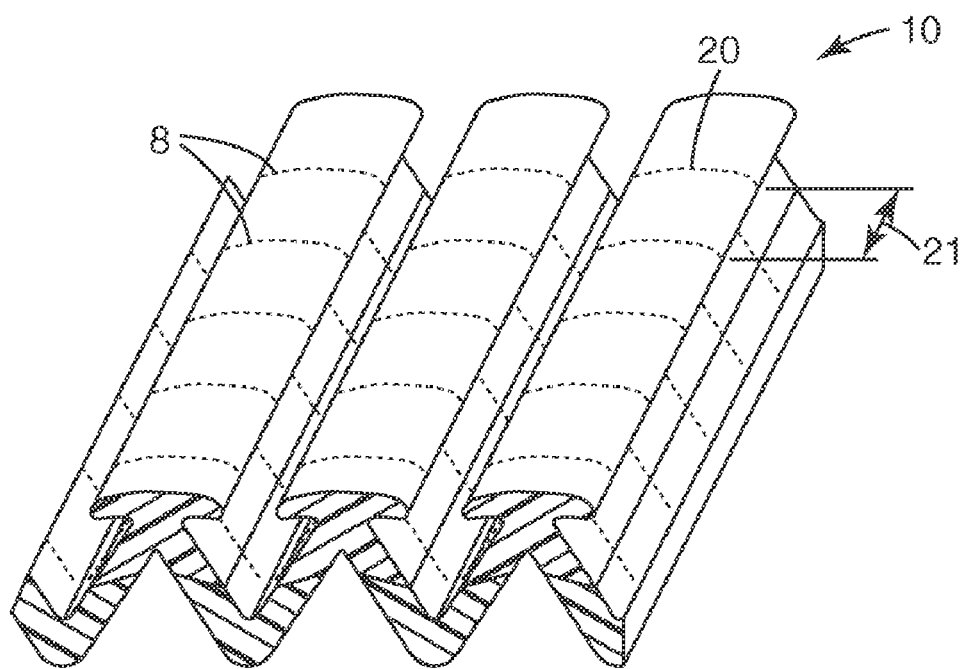
FIG. 14 is a perspective view of the FIG. 12 film cut on one face at regular intervals.
Figure 21:
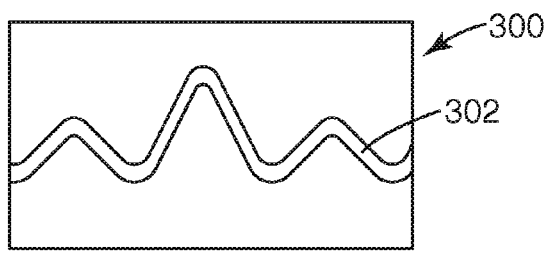
FIG. 21 is a cross-sectional view of a die plate used to form an alternative embodiment film in accordance with the present invention.

A method for forming a coextruded film of the invention is schematically illustrated in FIG. 1. Generally, the method includes first extruding a profiled multilayer film through a die plate 1 and 100, shown in FIGS. 2 and 11. The thermoplastic resin is delivered from conventional film extruders 51, 151 through the die 52 having die plate 1, 100 with a profiled non-rectilinear opening 2, 102 by non-rectilinear it is meant that the die plate opening as a whole is in a form other than a rectangle however portions of the die openings could be rectilinear. The die plate can be cut, for example, by electron discharge machining, shaped to form the nonplanar film 10, 110 which optionally (as per FIG. 12) can have elongate spaced structures 7 extending along one or both surfaces 3 and 4 of the film 10. If elongate spaced structures 7 are provided on one or both surfaces 3 and 4 of the film 10, the structures 7 can have any predetermined shape, including that of hook portions or members. The nonplanar film 10, 110 generally is pulled around rollers 55 through a quench tank 56 filled with a cooling liquid (e.g., water), after which the film 10, 110 can be transversely slit or cut at spaced locations 20, 120 along its length by a cutter 58 to form discrete cut portions of the film 10, 110 forming a netting precursor film as shown in FIGS. 5 and 14. Alternatively, the film can be rendered planar by heat treatment, such as in a heated nip or the like. While FIGS. 2 and 21 show die plates 100, 300 having profiled cut openings 102, 302 that are uniform in width across the die plate, it is also possible that the width can be changed across the die face if so desired. The thickness "t", as shown in FIG. 3a, of the extruded film can be constant or can vary across the film by varying the width of the profiled cut openings.

Figure 12:
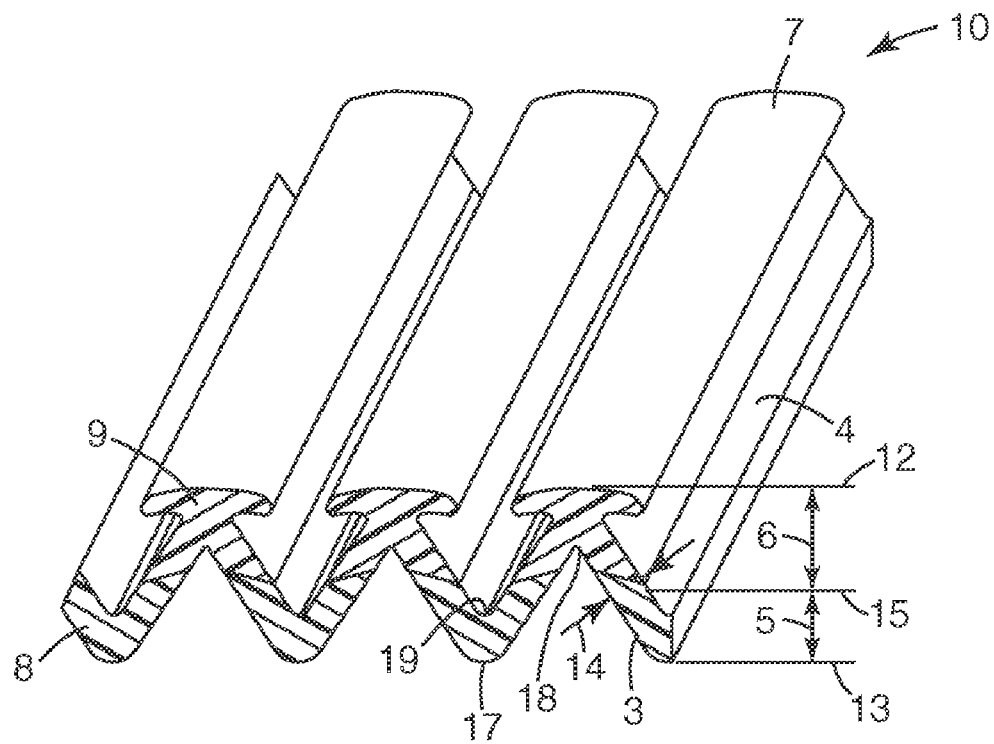
FIG. 12 is a perspective view of a film embodiment in accordance with the present invention having hook elements.
Figure 13:
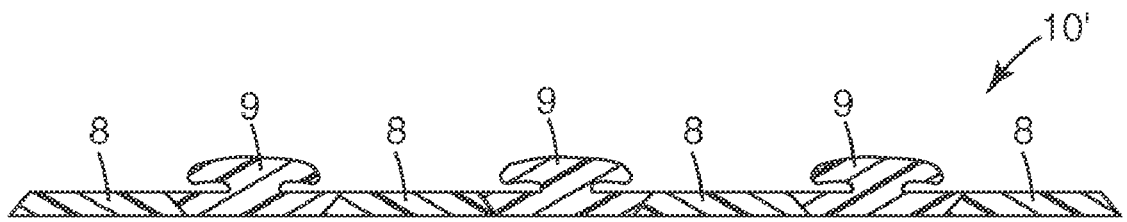
FIG. 13 is a cross-sectional view of the FIG. 12 film flattened to a planar form.

The coextruded films shown in FIGS. 3 and 12 are two layer constructions. A conventional two layer precursor film flowstream having an upper and lower zone is fed from the die into the die plates 1 or 100 (having a peak and valley shape) which causes the upper polymer flow film layer 9, 109 to collect in the upper half 6, 106 of the nonplanar film and the lower polymer flow film layer 8, 108 to collect in the lower half 5, 105 of the nonplanar film. The division of the two multi-stream polymer film layers between the upper and lower halves of the extruded nonplanar film would depend on their relative mass flow rates. The upper film layer 9, 109 could extend into the lower half 5 or 105 of the nonplanar film or the lower film layer 8, 108 could extend into the upper half 6, 106 of the nonplanar film. With a two layer construction, the upper and lower layers tend to disproportionally partition in a planar manner which results in distinct side-by-side partitioning in the finished film 110' or 10' without the need for complex flow diversions in the feedblock or die bodies. The polymers have been partitioned along the width-wise extension of the film 10' and 110' such that the proportion of the two (or more) polymers varies across film width. In the two layer embodiments, this variation is such that there is a substantially complete partitioning of the polymers from substantially 100 percent of the first polymer layer in a first width-wise zone to substantially 100 percent of the second polymer layer in a second width-wise zone. With three or more polymer layers at least one of the polymer layers, generally will vary in thickness across the transverse direction of the web. A polymer layer varying in thickness will generally comprise 0-90% of the total film thickness. Each of the layers can comprise from 0-100% of the total thickness of the film at any point across the width (Y-direction) of the film. The polymer layer varying in thickness will generally vary by at least 10 percent comparing the thickest region to the thinnest region or alternatively, by at least 20 percent or at least 50 percent. The partitioning will be dictated by the relative proportions of the precursor polymer film layers and the shape of the opening of the die plates 1 or 100. With a die plate having a regularly oscillating opening, the partitioning will result in a nonplanar film as shown in FIG. 3a where at a given plane the relative proportions of the polymers will be substantially identical assuming a coextruded polymer flow stream with constant ratios of the polymers across its width. Where the die plate openings vary in either thickness T', angle "β" amplitude "H", wavelength "W" or any combination thereof, as shown in FIG. 2, the partitioning of the polymer layers will vary but the flow streams will still partition between the peaks and valleys of the opening of the die plates. The degree of partitioning will also depend on the angle β between legs of the peak and valley openings of the die plate where the angle β is less than 90 degrees at least one of the layers will tend to be completely portioned such that it is discontinuously distributed in the formed film. This is particularly true where there is an outer film layer that forms less than 50 percent of the film. When the angle β is greater than 90 degrees, the layers tend to partition such that there is no discontinuous layers particularly where a layer is 50 percent or less of the film. Generally the angle β ranges from 170° to 5°, 140° to 10°, 110° to 20°, or 90° to 30°. The peak and valley structure of the opening of the die plates would generally correspond to the desired profiled film. The peak and valley structures could be regular oscillating curves as shown, step-function curves, or any other variation.

The film 10, 110 as shown in FIGS. 12 and 3 has a first top face 4, 104 and a second bottom face 3, 103 with a film thickness 14, 114 of from 25 microns to 1000 microns, preferably 50 microns to 500 microns. The film 10, 110 is nonplanar where the film oscillates, such as by peaks and valleys in the form of substantially continuous ridges, from a first upper plane 12, 112 to a second lower plane 13, 113. By this, it is meant the film itself, or the continuous film backing not structures on the film surface, is nonplanar and oscillates from the upper plane to the lower plane. The film backing oscillates around a midline 15, 115 and the nonplanar film is characterized by a first half 6, 106 extending on one side of the midline 15, 115 and a second half 5, 105 extending on the opposing side of the midline 15, 115. The peaks of the ridges on the film backing or the top of structure 45, 145, on the top face of the film, generally extend at least to the upper plane 12, 112. The peaks of the ridges on the film backing, or individual peaks 45, 145 can terminate below or above the upper plane 12, 112 preferably at a point between the midline 15, 115 and the top plane 12, 112. The peaks 17, 117 on the bottom face 3, 103 of the film backing also extend generally at least to the lower plane 13, 113. However, again the film backing plane or individual peaks can terminate above or below the lower plane 13, 113 and preferably between the midline 15, 115 and the lower plane 13, 113. The peaks generally alternate from the lower plane 13, 113 to the upper plane 12, 112 but multiple peaks can extend, in a row, to either the upper plane or the lower plane without extending to the other half of the nonplanar film face by having the intermediate peaks only extending to the midline or below the midline. Generally, the nonplanar film will have at least about 2 peaks (45, 145 and/or 17, 117) per linear centimeter (cm) and preferably at least 5 extending up to 50 peaks per linear centimeter. Each peak can extend past the midline of the film to an extent such that the underside 18, 118 of the peak extends past the underside 19, 119 of the adjacent opposing peak by at least 10 microns, preferably at least 50 microns. The distance 6, 106 or 5, 105 between the midline and the upper plane 12, 112 or lower plane 13, 113 is generally about 50 microns to 2000 microns preferably about 100 microns to 1000 microns.

Figure 7:
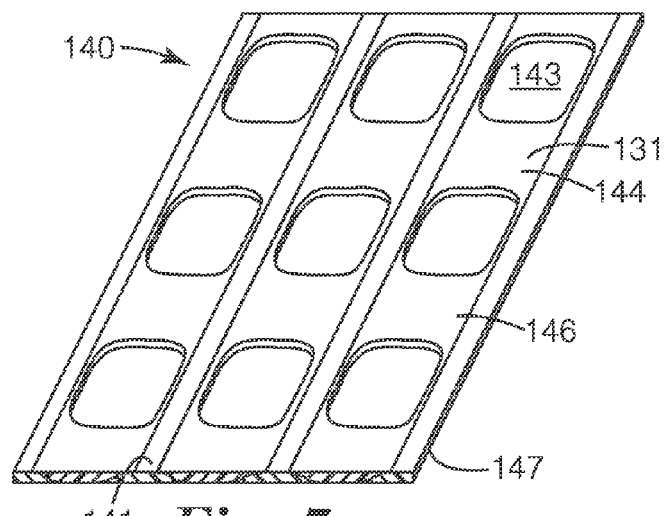
FIG. 7 is a perspective view of a netting in accordance with the present invention produced from the FIG. 6 cut film.
Figure 14A:
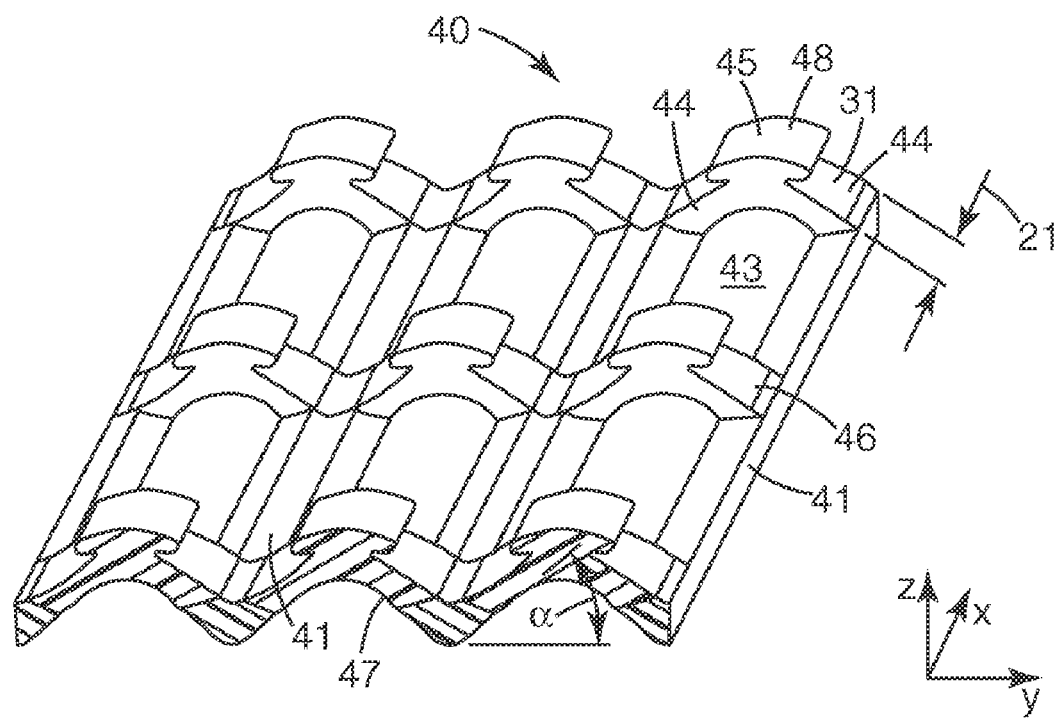
FIG. 14a is a perspective view of a netting in accordance with the present invention.

With cut films, as shown in FIGS. 14 and 5, the distance between the cuts 20, 120 corresponds to about the desired width 21, 121 of the cut portions 31, 131 to be formed, as is shown, for example, in FIGS. 7 and 14a. The cuts 20, 120 can be at any desired angle, generally from 30° to 150°, from the lengthwise extension of the film (X-direction). Optionally, the film can be stretched prior to cutting to provide further molecular orientation to the polymeric film 10, 110 and reducing the thickness 14, 114 of the film 10, 110 and any structures on the film. The cutter can cut using any conventional means such as reciprocating or rotating blades, lasers, or water jets, however preferably the cutter uses blades oriented at an angle of about 60 to 90 degrees with respect to lengthwise extension of the film 10, 110.

The film of FIGS. 3 and 12 can also be formed into nettings. In this embodiment, the films 10 or 110 are cut on either the upper face 4, 104 or the lower face 3, 103 from the upper plane 12, 112 toward the midline 15, 115 or from the lower plane 13, 113 toward the midline 15, 115, as shown, for example, in FIGS. 14 and 5. The cuts 20 or 120 extend from the upper or lower plane at least through the undersides 18, 118 or 19, 119 of the peaks. At least some of the peaks 45, 145 on the face are cut and preferably all or substantially all of the peaks are cut. The cuts 20 or 120 will preferably at least extend to the midline of a film backing Generally the cuts can extend so that they go to the undersides of the opposing peaks. Preferably, the cuts will terminate before reaching substantially all of the undersides of the opposing peaks to avoid severing the film. Undersides of the peaks on one face will form the valleys of the opposing face. In an alternative embodiment, the film can be cut on both faces as described above as long as the cuts on opposing faces are offset so as not to completely sever the film. The distance between cuts 21 and 121, which form the cut portions 31 and 131, is generally 100 microns to 1000 microns, preferably from 200 microns to 500 microns. The cut portions 31, 131 form the strands 46, 146 extending in the cross-direction of the netting 40, 140. The strands 41, 141 extending in the lengthwise direction are formed by the uncut portions of the film. These lengthwise strands are generally continuous when the film backing is cut on only one face. At least some of the cross direction strands 46 and 146 are at least in part generally always continuous when the cuts are continuous.

Figure 6:
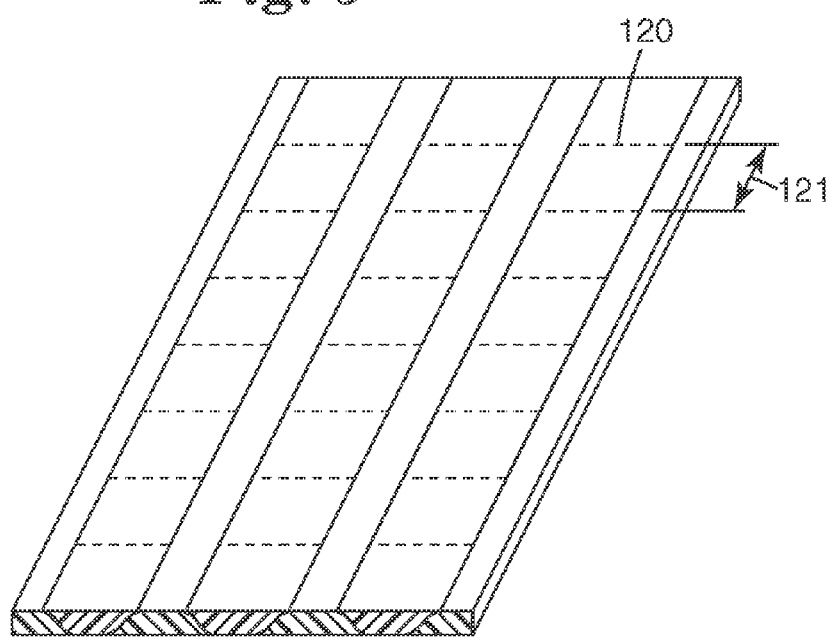

After cutting of the film 10, 110 the film can be flattened as in the FIG. 6 embodiment or left as an oscillating film as in the FIG. 14 embodiment. The cut film can then be longitudinally stretched at a stretch ratio of 2:1 to 4:1, and preferably at a stretch ratio of at least about 3:1, preferably between a first pair of nip rollers 60 and 61 and a second pair of nip rollers 62 and 63 driven at different surface speeds. This forms the open three dimensional netting shown in e.g., FIGS. 14a and 7. Roller 61 is typically heated to heat the film prior to stretching, and roller 62 is typically chilled to stabilize the stretched film. Optionally, the film can also be transversely stretched to provide orientation to the film in the cross direction and flatten the profile of the netting formed. The film could also be stretched in other directions or in multiple directions. The above stretching method would apply to all embodiments of the invention. With the films cut on only one face, the open areas 43 and 143 generally are separated by linear strands 41, 141, which strands have a non-rectilinear cross-section or are nonplanar along their length or both. The transverse strands are generally nonplanar, although they can be rectilinear in cross-section. Nonplanar strands or a nonplanar netting provides for a more flexible netting which creates breathability both through the film (by the open area of the netting) and along the plane of the reticulated netting, due to its nonplanar nature. The open areas generally comprise about at least 50 percent of the surface area of the netting and preferably at least 60 percent. The surface area of the netting is the planar cross-sectional area of the netting in the X-Y plane. This large percentage open area creates an extremely flexible and breathable netting. The hook heads formed on hook nettings are preferably smaller than the individual openings in the netting in the direction parallel with the hook head overhangs such that the hook netting is non-self engaging. In the hook netting embodiment of FIG. 14a this would be the transverse direction Y.

Stretching causes spaces 43 and 143 between the cut portions 31 and 131 of the film and creates the longitudinal strands 41 and 141 by orientation of the uncut portions of the film. The transverse strands 44, 144 are formed by interconnected cut portions each of which has leg portions which join at the peak 45, 145. The leg portions of adjacent cut portions are connected by strands (e.g., 41 and 141) or the uncut film portions.

FIGS. 14a and 7, 10, 17, 20, 23, 26 are exemplary polymeric mesh or nettings, which can be produced, according to the present invention, generally designated by the reference numerals 40, 140. The netting comprises upper 46, 146 and lower 47, 147 major surfaces. The cut ridges on the upper surface 46 form a multiplicity of hook members 48.

The netting is formed having transversely extending strands that are created by the cut portions of the three-dimensional film extending in the cross direction and longitudinally extending strands created by at least in part by uncut portions of the film. When tension or stretching is applied to the film in the lengthwise direction, the cut portions 31, 131 of the film separate, as shown in the embodiments of FIGS. 14a and 7. When the film is cut on only one face, the uncut portions of the film, between cut lines, are aligned in the lengthwise direction resulting in formation of linear strands 41, 141 extending in the lengthwise direction upon stretching or tensioning of the cut film. The transverse strands 44, 144 are created by the cut portions in the embodiments shown in FIGS. 14a and 7. The cut portions connect the longitudinal strands 41, 141 formed by the uncut portions. In the FIG. 14a embodiment, the hook elements formed on the cut portions form a reticulated netting having hook engaging elements providing a breathable, compliant and deformable hook netting. A hook netting of this type is extremely desirable for limited use articles such as disposable absorbent articles (e.g., diapers, feminine hygiene articles, limited use garments and the like).

The netting is characterized by having no bond points or bonding material at the cross-over points of the transverse and longitudinal strands. The netting is integrally formed of a continuous material. The connection between the strand elements is created in the film formation process where the strands are created by cutting of an integral film. As such the netting at the cross-over points is a continuous homogeneous polymeric phase. Namely, there are no interfacial boundaries caused by fusion or bonding of separate strand elements at the strand cross-over points. Preferably, at least one set of strands has molecular orientation caused by stretching; this generally would be the longitudinal strands. These oriented strands could be of any cross-sectional profile and would tend to become rounded due to polymer flow during stretching. Orientation creates strength in these strands providing a dimensionally stable web in the direction of orientation with continuous linear strands. Unoriented strands are generally rectilinear in cross-section due to the cutting operation. The two sets of strands generally will intersect a planar face of the netting at an angle α, in the Z or thickness direction, of greater than zero (0) generally 20 degrees to 70 degrees, preferably 30 degrees to 60 degrees.

Formed netting can also be heat treated preferably by a non-contact heat source. The temperature and duration of the heating should be selected to cause shrinkage or thickness reduction of at least the hook head by from 5 to 90 percent. The heating is preferably accomplished using a non-contact heating source which can include radiant, hot air, flame, UV, microwave, ultrasonics or focused IR heat lamps. This heat treating can be over the entire strip containing the formed hook portions or can be over only a portion or zone of the strip. Different portions of the strip can be heat treated to more or less degrees of treatment.

Figure 8:
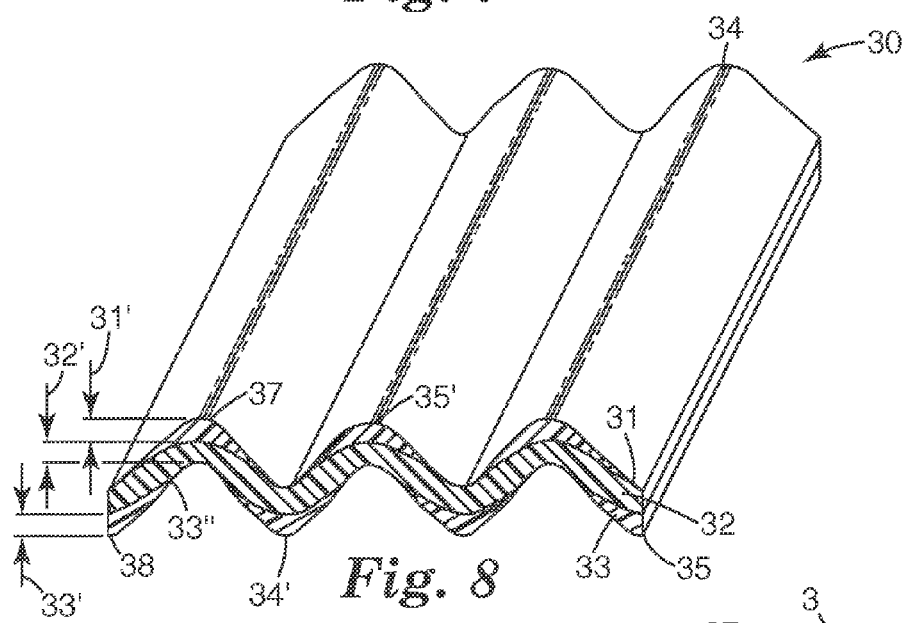
FIG. 8 is a perspective view of a three layer film embodiment in accordance with the present invention.
Figure 8A:
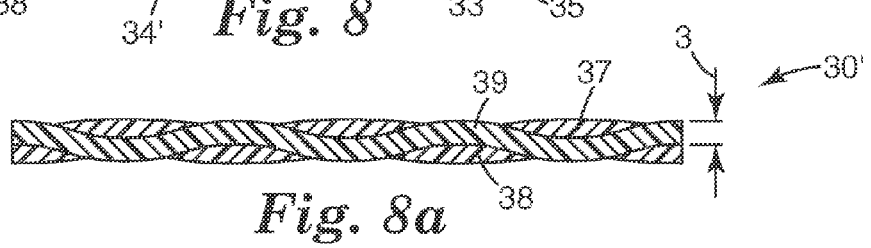
FIG. 8a is a cross-sectional view of the FIG. 8 film flattened to a planar form.
Figure 8B:
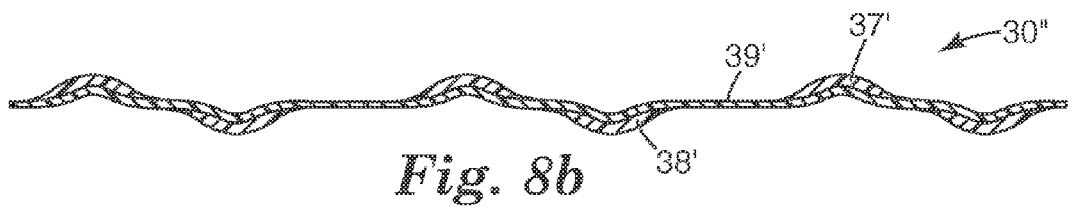
FIG. 8b is a cross-sectional view of the FIG. 8a film oriented in the cross-direction

FIG. 8 is an alternative embodiment of the FIG. 3 film 30 formed with three polymer layers 37, 38 and 39. This again would result in unequal partitioning of these three layers across the widthwise dimension of the film 30 when extruded through the profiled die plate 100 of FIG. 2. The partitioning is most extreme with the outermost layers adjacent the peaks and valleys of the die plate. This is due to pooling of the outermost layers in the peak and valley regions while the center polymer flow gets generally equally distributed. This can be seen more clearly in FIG. 8a where the FIG. 8 film 30 has been flattened into a planar film 30'. The three layers 31, 32 and 33 vary in thickness across the width of the film such that the upper film layer 37 goes from a maximum 31' to a minimum of 31 from a peak 34 to a valley 35 and the lower film layer 38 goes from a maximum thickness 33' to a minimum thickness 33" from a peak 34' to a valley 35'. The middle layer 32 remains substantially consistent in thickness 32'. The film 30 could then be stretched or oriented in the lengthwise or width dimension as shown in FIG. 8b resulting in a thinning of the layers 37', 38' and 39'. FIG. 8b depicts the FIG. 8a film after it has been stretched in the transverse direction.

Figure 9:
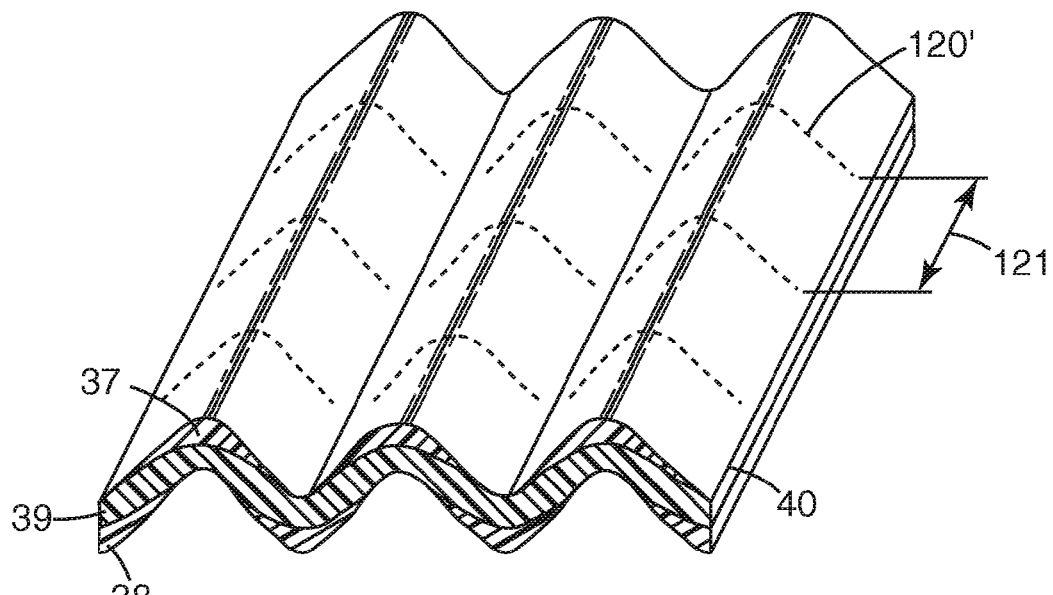
FIG. 9 is a perspective view of the FIG. 8 film cut on one face at regular intervals.
Figure 10:
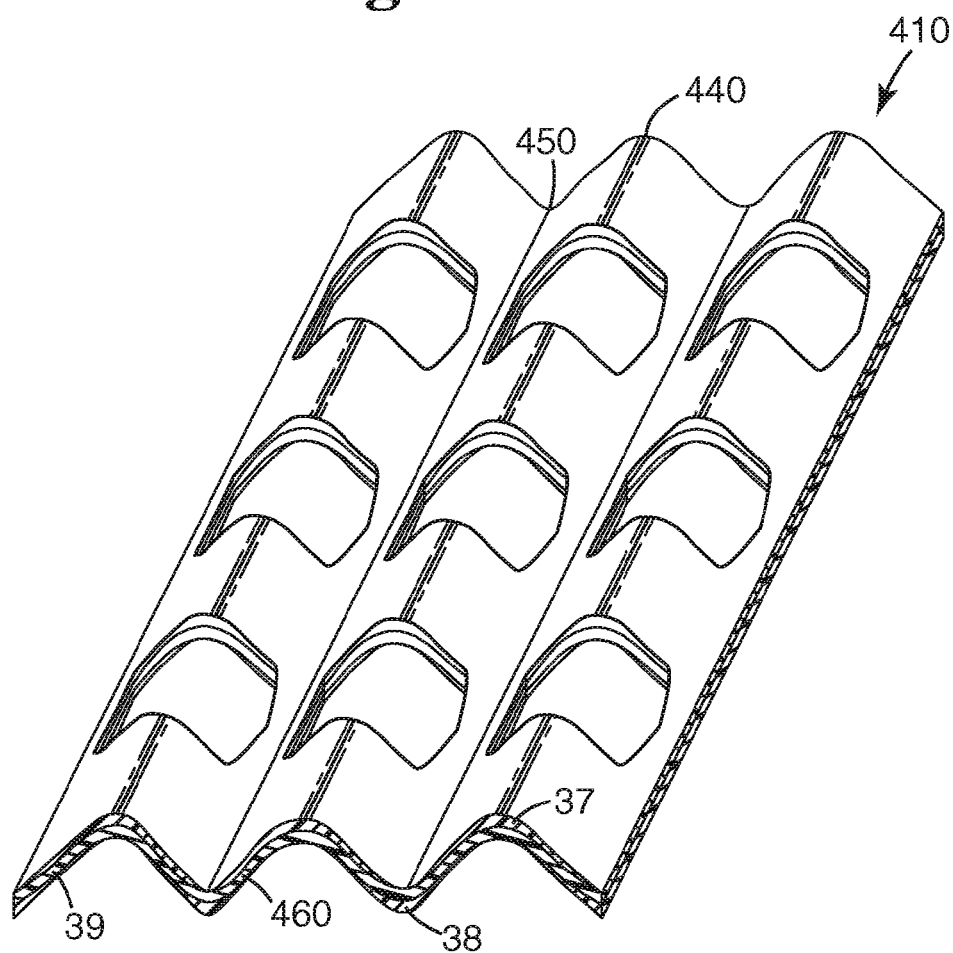
FIG. 10 is a perspective view of the FIG. 9 cut film oriented in the length direction to form a netting.

The FIG. 9 embodiment is identical to the FIG. 5 embodiment but uses the three layer film of FIG. 8. The resulting netting, 410 as shown in FIG. 10 has been stretched while the film is still in its profiled non-planar form. It could be flattened before or after stretching. Due to the dissimilar partitioning of the layers 37 and 38, the peak regions 440 and valley regions 450 will have different properties than the mid-region 460, between the peak and valley regions, which valley regions have taken the form of continuous strands.

Figure 15:
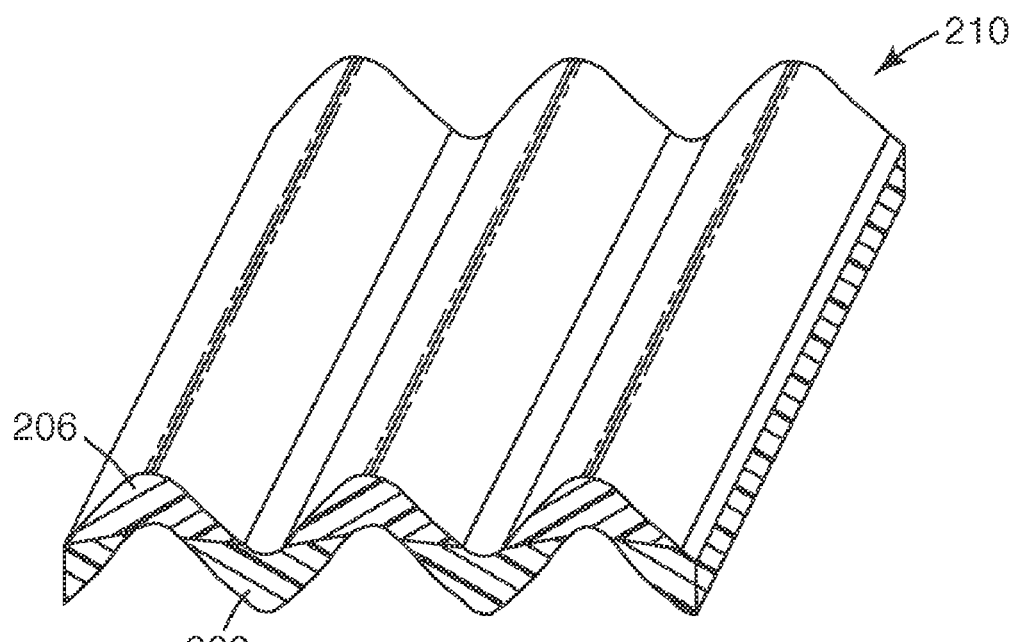
FIG. 15 is a perspective view of a two layer film in accordance with the present invention.
Figure 16:
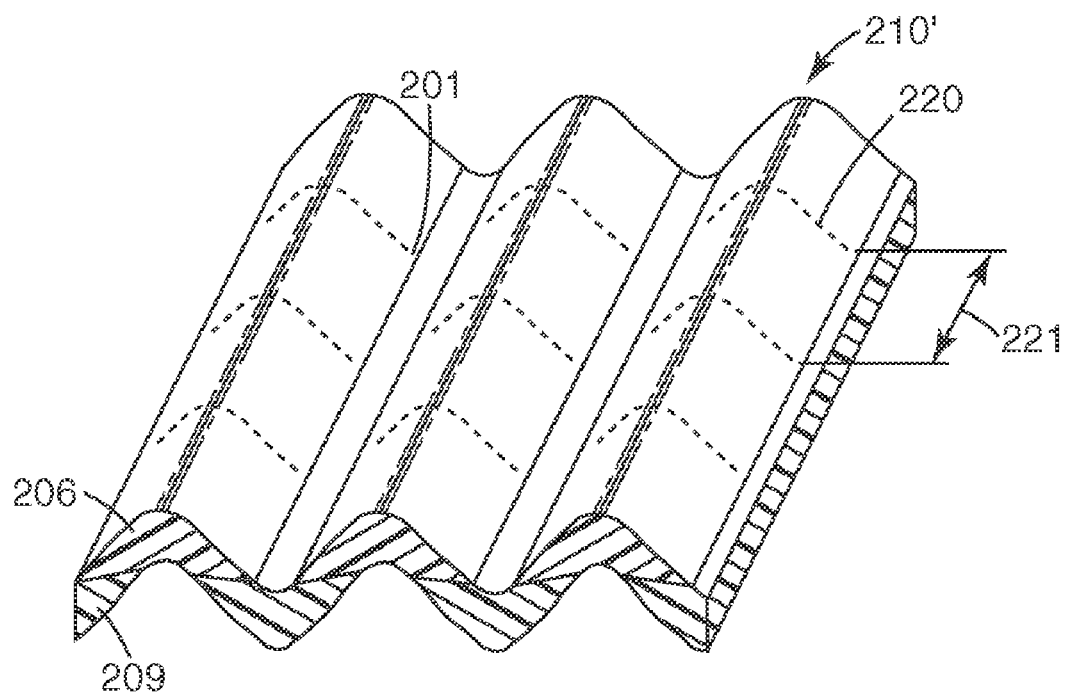
FIG. 16 is a perspective view of the FIG. 15 film cut at regular intervals on one face.
Figure 17:
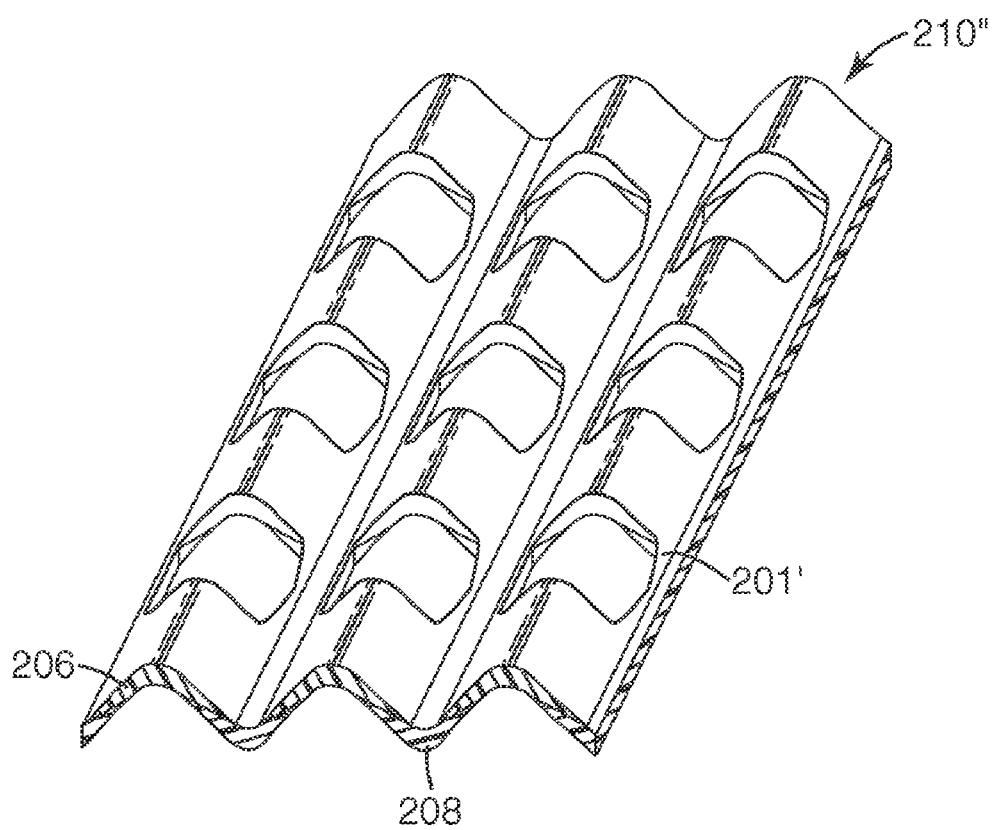
FIG. 17 is a perspective view of the FIG. 16 cut film length oriented to form a netting.

FIGS. 15 and 16 are embodiments similar to that of FIG. 5 but where the cuts 220 extend only partially through the upper polymer layer 206 leaving a small portion 201 uncut. This allows a small portion of the upper polymer layer 206 to modify the behavior of the lower polymer layer 209 when the cut film 210' is stretched as shown in FIG. 17. This small portion 201' of the first polymer layer can, for example, create a reinforcing effect if the lower polymer layer is an elastomeric polymer and the upper layer is relatively inelastic polymer. This would stabilize the cut film 210' prior to orientation in the lengthwise dimension to allow for handling but allow the elastic behavior to be utilized following a stretch activation. Following a stretch activation, the relatively inelastic uncut material 201 would permanently deform. If the upper polymer layer 206 were an elastomeric layer and the lower layer 209 was relatively inelastic, the uncut elastic region 201 would allow the elastic material to be more securely bonded to the lower inelastic layer 209 following orientation of the cut film 210' into netting 210".

Figure 18:
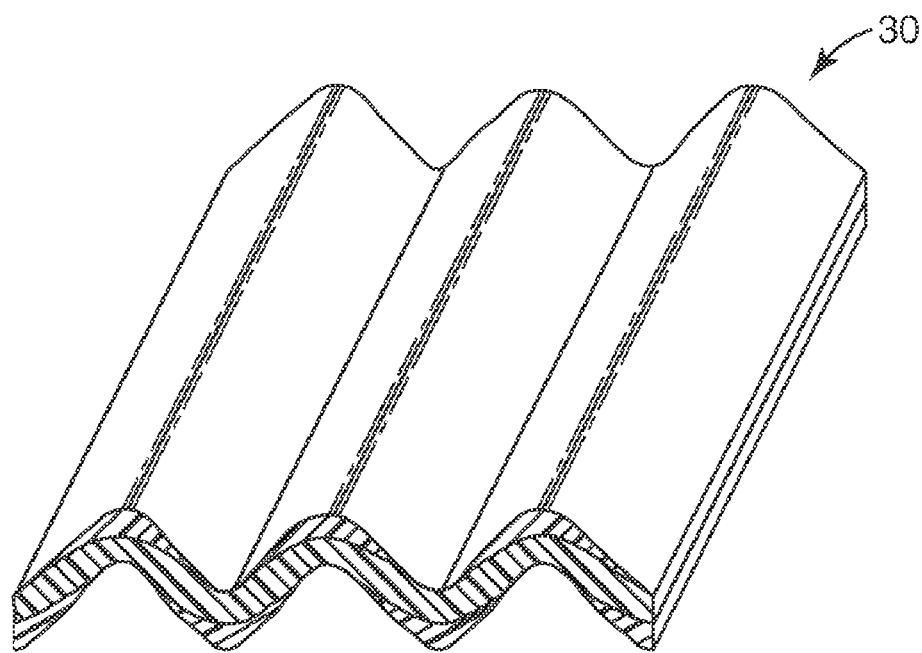
FIG. 18 is a perspective view of a film with three layers in accordance with the present invention.
Figure 19:
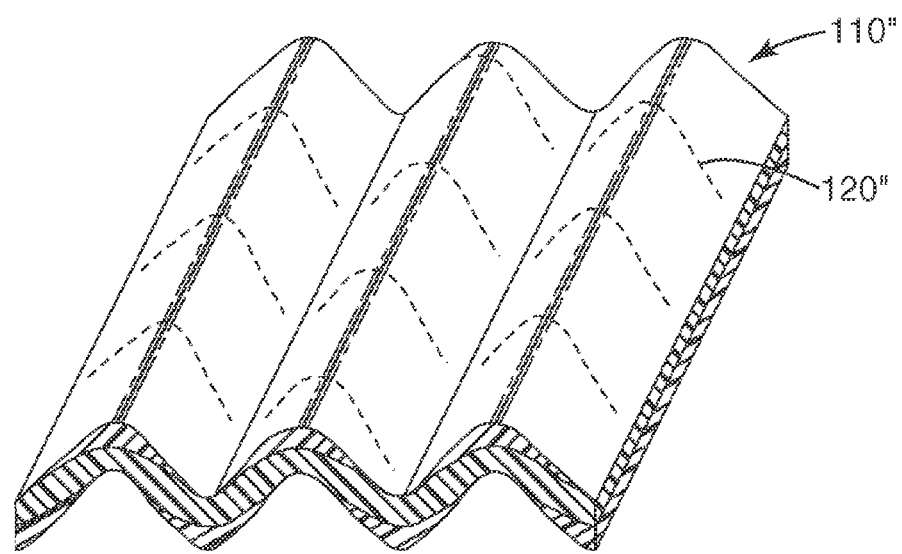
FIG. 19 is a perspective view of the FIG. 18 film cut at an angle to the ridges.
Figure 20:
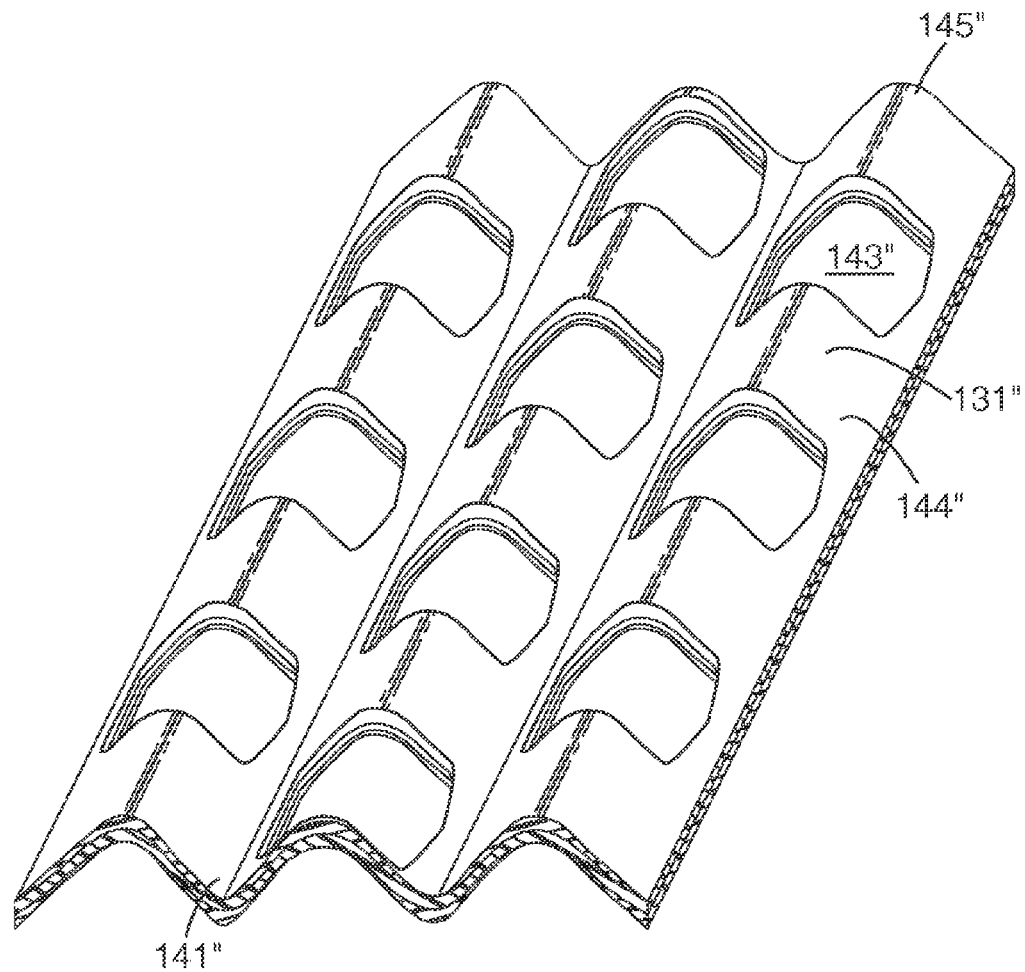
FIG. 20 is a perspective view of the netting produced from the FIG. 19 cut film.

FIG. 18 is the FIG. 8 film which is then cut in accordance with the cut pattern shown in FIG. 19. This embodiment is substantially the same as that of FIGS. 5 and 6 except that the cuts 120" are at an angle that is relatively non-parallel to the transverse direction of the film 110". This film when longitudinally stretched (the lengthwise direction) results in a netting such as shown in FIG. 20 resulting in spaces 143" between the cut portion 131" and longitudinal strands 141". The transverse strands 144" are formed by interconnected cut portions 131"each of which has leg portions which join at the peaks 145" and at the uncut film portion 141". The spaces 143" are staggered and aligned in the direction of the cuts as are the transverse strands 144".

Figure 21A:
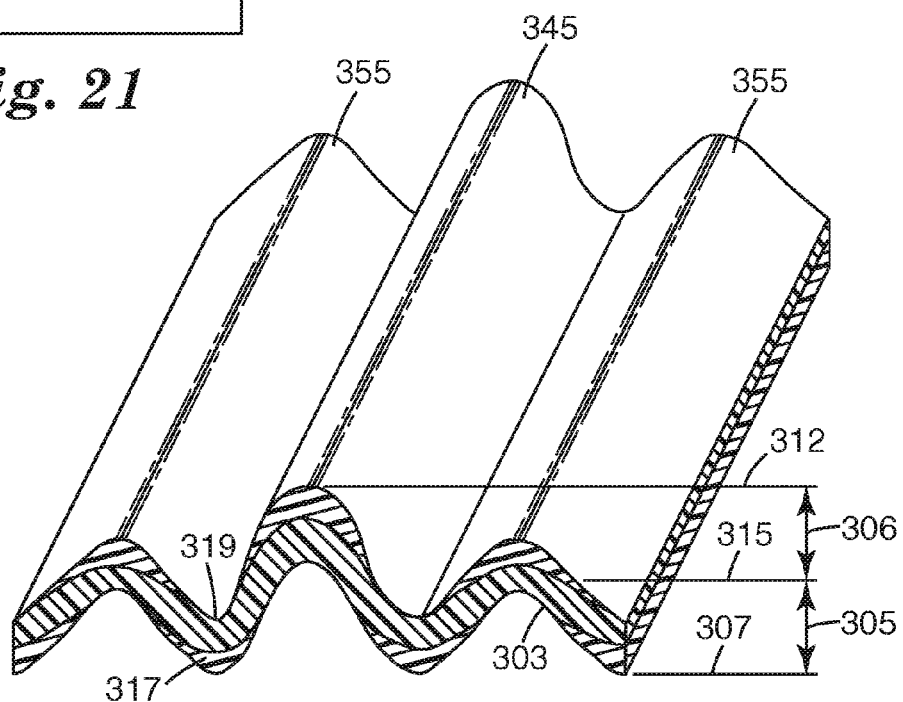
FIG. 21a is a perspective view of a film produced with the FIG. 21 die plate.
Figure 22:
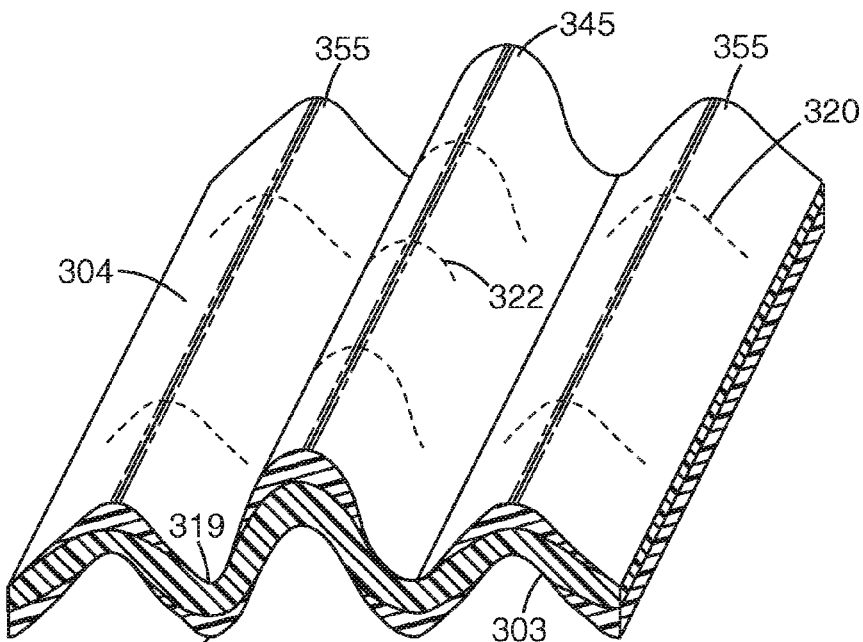
FIG. 22 is a perspective view of the FIG. 21a film cut at alternating depths on one face.
Figure 23:
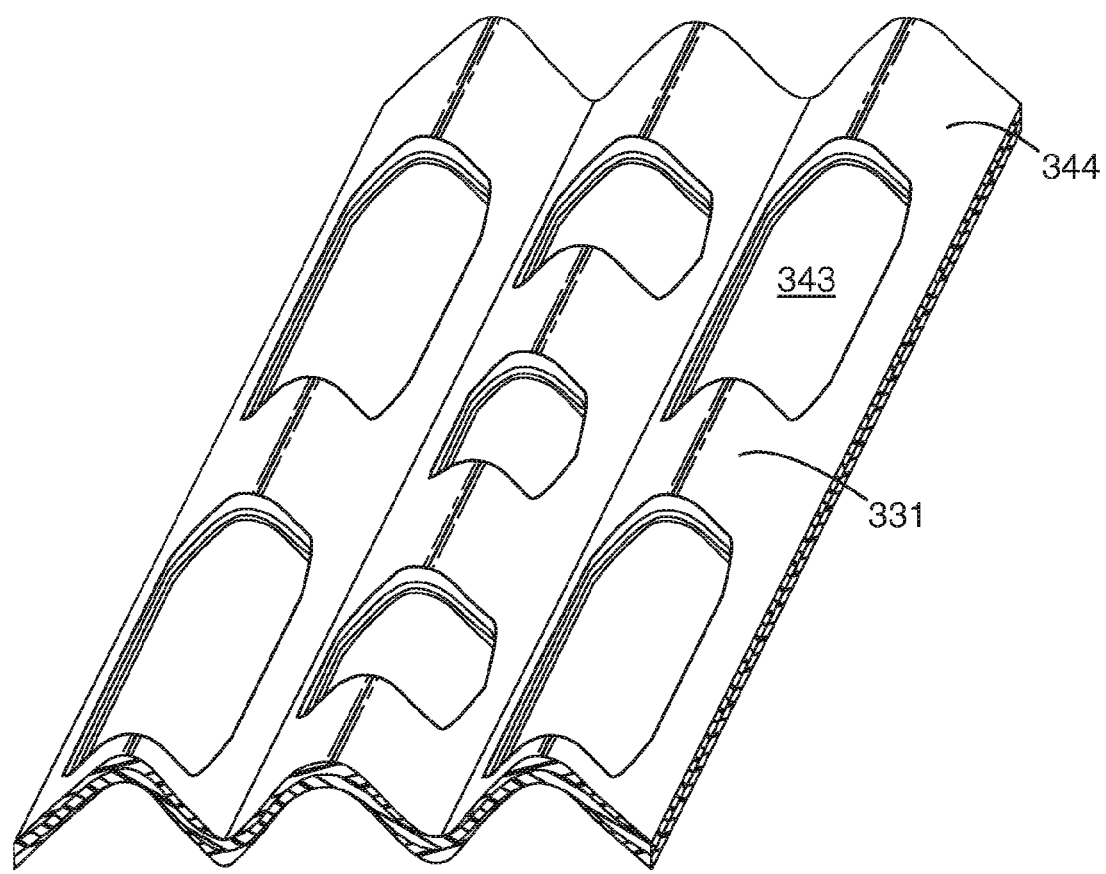
FIG. 23 is a perspective view of a netting produced from the FIG. 22 cut film.

FIG. 21 is an alternative die plate 300 with a cutout 302 shaped to form a precursor film as shown in FIG. 21a having an upper plane 312 and a lower plane 307. In this embodiment, some of the ridges 345 are larger than others with intermediate ridges 355 having peaks terminating below the upper plane 312 but above the midline 315. This film is then cut with multiple cuts 322, 320 on one face at varying depths as shown in FIG. 22 cut from the upper face 304 or upper plane towards the midline 315 having an upper half 306 and lower half 305. The lower face 303 is uncut. The deeper cuts 320 extend from the upper plane at least through the undersides of the intermediate ridges 355. The lower ridges 317 are uncut with the cuts terminating prior to the underside 319 of the lower ridges 317. The shallow cuts 322 only cut the larger ridges 345 resulting in some of the larger ridges 345 having more cuts and at different depths. This results in a netting such as shown in FIG. 23 with many different sizes and shapes of spaces 343, between the various cut portions 331. The transverse strands 344 are similar to those of the embodiment of FIGS. 5 and 6 but are created by the deepest and the most widely spaced cuts.

Figure 24:
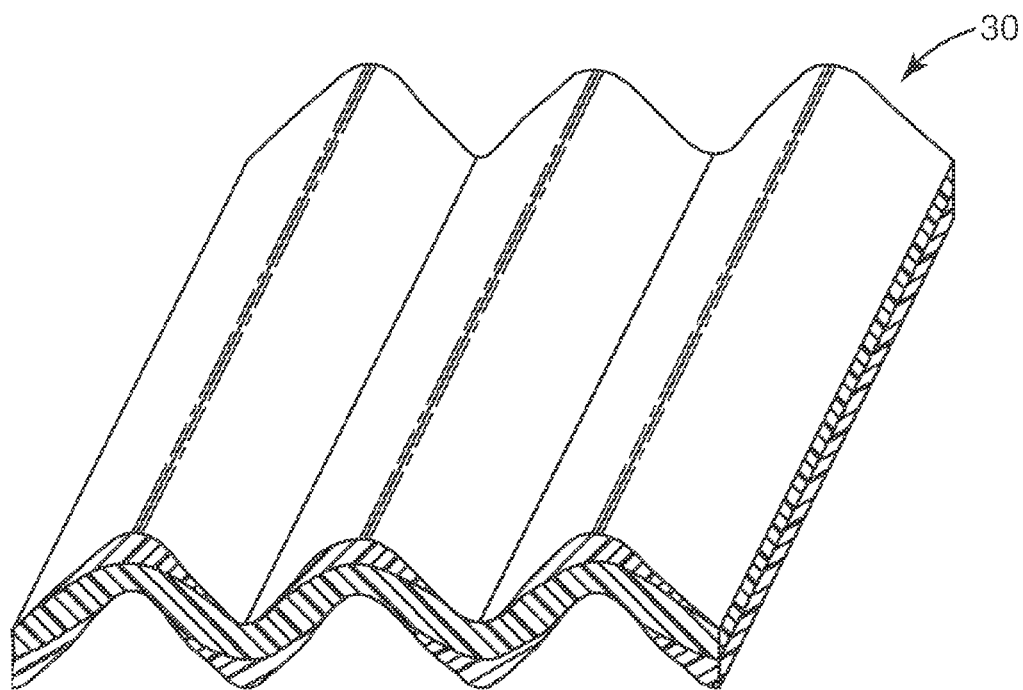
FIG. 24 is a perspective view of a film in accordance with the present invention.
Figure 25:
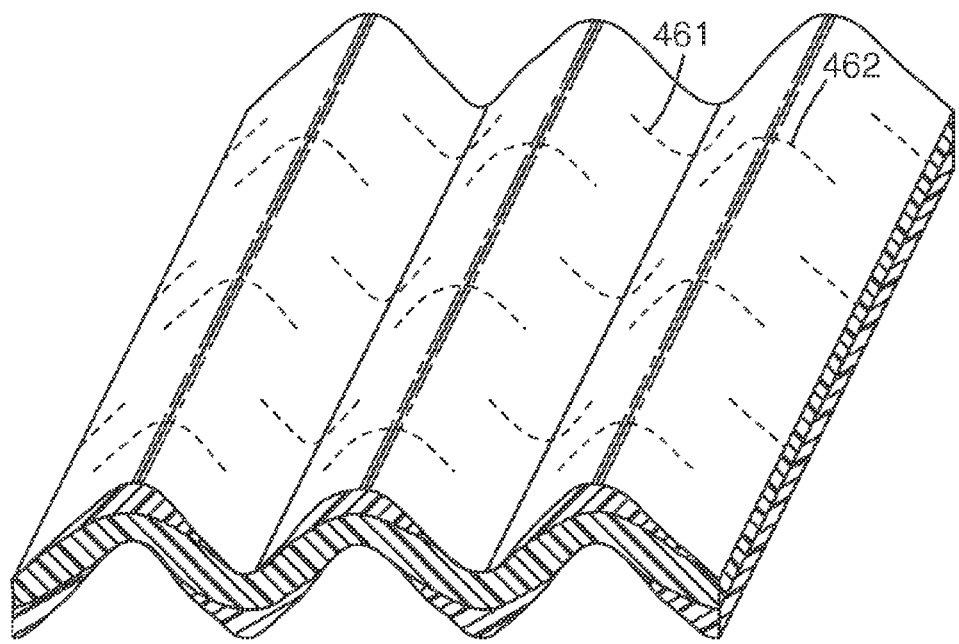
FIG. 25 is a view of the FIG. 24 film cut on both faces.
Figure 26:
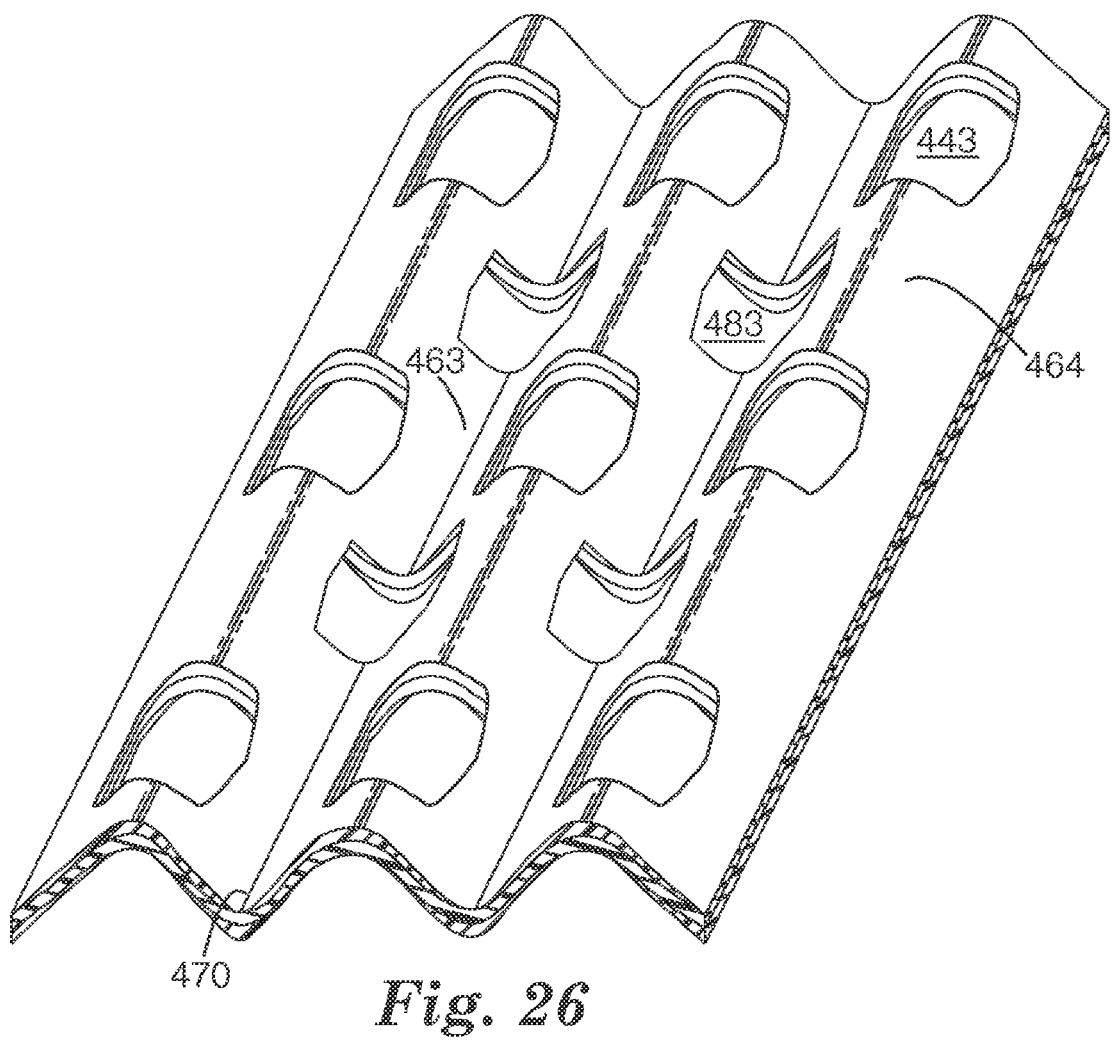
FIG. 26 is perspective view of a netting produced from the FIG. 25 cut film.

FIG. 24 is the FIG. 18 precursor film, which is then cut on opposite film faces where the cuts are substantially nonoverlapping. This results in longitudinal strands formed primarily by the uncut portions. The cuts 461 and 462 are on either face and are equally spaced and offset. When this embodiment cut film, as shown in FIG. 25, is longitudinally stretched the resulting netting is as shown in FIG. 26. In this embodiment, the longitudinal strands 470 are generally formed from the uncut portions 464 and 463 extending in the Z-direction. The spaces 443 and 483 are on different planes. This is a version of the FIG. 10 netting with spaces on either face but with discontinuous longitudinal strands. Longitudinal strand segments would tend to be oriented.

Suitable polymeric materials from which the coextruded film of the invention can be made include thermoplastic resins comprising polyolefins, e.g. polypropylene and polyethylene, polyvinyl chloride, polystyrene, nylons, polyester such as polyethylene terephthalate and the like and copolymers and blends thereof. Preferably the resin is a polypropylene, polyethylene, polypropylene-polyethylene copolymer or blends thereof.

The multilayer construction can utilize any multilayer or multicomponent film extrusion process such as disclosed in U.S. Pat. Nos. 5,501,675; 5,462,708; 5,354,597 and 5,344,691, the substance of which are substantially incorporated herein by reference. These references teach various forms of multilayer or coextruded elastomeric laminates, with at least one elastic layer and either one or two relatively inelastic layers. A multilayer film, however, could also be formed of two or more elastic layers or two or more inelastic layers, or any combination thereof, utilizing these known multilayer multicomponent coextrusion techniques.

Inelastic layers are preferably formed of semicrystalline or amorphous polymers or blends. Inelastic layers can be polyolefinic, formed predominately of polymers such as polyethylene, polypropylene, polybutylene, or polyethylene-polypropylene copolymer.

Elastomeric materials which can be extruded into film include ABA block copolymers, polyurethanes, polyolefin elastomers, polyurethane elastomers, EPDM elastomers, metallocene polyolefin elastomers, polyamide elastomers, ethylene vinyl acetate elastomers, polyester elastomers, or the like. An ABA block copolymer elastomer generally is one where the A blocks are polyvinyl arene, preferably polystyrene, and the B blocks are conjugated dienes specifically lower alkylene diene. The A block is generally formed predominately of monoalkylene arenes, preferably styrenic moieties and most preferably styrene, having a block molecular weight distribution between 4,000 and 50,000. The B block (s) is generally formed predominately of conjugated dienes, and has an average molecular weight of from between about 5,000 to 500,000, which B block(s) monomers can be further hydrogenated or functionalized. The A and B blocks are conventionally configured in linear, radial or star configuration, among others, where the block copolymer contains at least one A block and one B block, but preferably contains multiple A and/or B blocks, which blocks may be the same or different. A typical block copolymer of this type is a linear ABA block copolymer where the A blocks may be the same or different, or multi-block (block copolymers having more than three blocks) copolymers having predominately A terminal blocks. These multi-block copolymers can also contain a certain proportion of AB diblock copolymer. AB diblock copolymer tends to form a more tacky elastomeric film layer. Other elastomers can be blended with a block copolymer elastomer (s) provided that they do not adversely affect the elastomeric properties of the elastic film material. A blocks can also be formed from alphamethyl styrene, t-butyl styrene and other predominately alkylated styrenes, as well as mixtures and copolymers thereof. The B block can generally be formed from isoprene, 1,3-butadiene or ethylene-butylene monomers, however, preferably is isoprene or 1,3-butadiene.

With all multilayer embodiments, layers could be used to provide specific functional properties in one or both directions of the film such as elasticity, softness, hardness, stiffness, bendability, roughness or the like. The layers can be directed at different locations in the Z direction that are formed of different materials creating a film with cross-direction variation in properties such as described above.

Hook Dimensions

The dimensions of the reticulated webs were measured using a Leica microscope equipped with a zoom lens at a magnification of approximately 25×. The samples were placed on a x-y moveable stage and measured via stage movement to the nearest micron. A minimum of 3 replicates were used and averaged for each dimension.

Example 1

A coextruded profiled web was made using apparatus similar to that shown in FIG. 1 except three extruders were used to produce a 3 layer structure consisting of a first 'A' white layer, a second 'B' red layer and a third 'C' red layer. The first layer was produced with a polypropylene/polyethylene impact copolymer (99% 7523, 4.0 MFI, Basell Polyolefins Company, Hoofddorp, Netherlands) and 1% white TiO2 polypropylene-based color concentrate. The second and third layers were produced with 98% 7523 polypropylene/polyethylene impact copolymer and 2% red polypropylene-based color concentrate. A 6.35 cm single screw extruder was used to supply 7523 copolymer for the first layer, a 3.81 cm single screw extruder was used to supply 7523 copolymer for the second layer and a 2.54 cm single screw extruder was used to supply 7523 copolymer for the third layer. The barrel temperature profiles of all three extruders were approximately the same from a feed zone of 215° C. gradually increasing to 238° C. at the end of the barrels. The melt streams of the three extruders were fed to a ABC three layer coextrusion feedblock (Cloeren Co., Orange, Tex.). The feedblock was mounted onto a 20 cm die equipped with a profiled die lip similar to that shown in FIG. 2. The feedblock and die were maintained at 238° C. The die lip was machined such that the angle (β) between two successive channel segments was 67 degrees. After being shaped by the die lip, the extrudate was quenched and drawn through a water tank and around an idler roll at a speed of 6.4 meter/min with the water being maintained at approximately 45° C. The web was air dried and collected into a roll. The resulting web as depicted in FIG. 3 had a pronounced sinusoidal-type structure with a partitioning of the white (A) and red (B & C) layers into an upper plane (peaks) and lower plane (valleys), respectively. The red (B & C) layers are depicted as 1 layer in FIG. 3 because the material forming the two layers is identical and thus acts as 1 layer in this embodiment. The basis weight, wavelength (w), amplitude (h) and thickness (t) of the sinusoidal shaped web as depicted in FIG. 3a was measured and is reported in Table 1 below.

Example 2

A coextruded profiled web was made as in Example 1 except the extrudate was drawn through the water tank and around an idler roll at a speed of 9.5 meters/min. The tension of the web against the idler roll tended to flatten the overall sinusoidal structure. A significantly thinner, lighter weight web was produced having a relatively flat planar structure with surface irregularities corresponding to the peak and valley regions of the extrudate as it exited the die plate. The physical dimensions of the web are shown in Table 1 below.

Example 3

A coextruded profiled web was made as in Example 1 except the red 'B' & 'C' layers were produced using a styrene-isoprene-styrene block copolymer (KRATON 1114, Kraton Polymers Inc., Houston, Tex.). Partitioning of the layers resulted in a web having elastic properties in the transverse direction and inelastic properties in the machine direction. The physical dimensions of the web are shown in Table 1 below.

TABLE 1

|  | Example 1 | Example 2 | Example 3 |
|---|---|---|---|
| Basis Weight (grams/meter$^2$) | 233 | 155 | 239 |
| Wavelength - w (microns) | 660 | 635 | 660 |
| Amplitude - h (microns) | 890 | 610 | 900 |
| Thickness - t (microns) | 220 | 90 | 185 |

We claim:

1. A nonplanar, thermoplastic polymeric film having a top surface, a bottom surface, a midline, and a series of peaks and valleys oscillating around the midline and forming continuous ridges in a first direction on both the top surface and the bottom surface of the film, the nonplanar, thermoplastic polymeric film having a uniform thickness across its width and comprising two or more polymer layers with at least one polymer layer partitioned disproportionally from the midline to the peaks such that at least two of the polymer layers vary in thickness across the width of the nonplanar, thermoplastic polymeric film.

2. The nonplanar, thermoplastic polymeric film according to claim 1, wherein the nonplanar, thermoplastic polymeric film has no planar portions between the peaks and valleys.

3. The nonplanar, thermoplastic polymeric film of claim 1, wherein the nonplanar, thermoplastic polymeric film has a thickness of from 25 to 1000 microns.

4. The nonplanar, thermoplastic polymeric film of claim 1, wherein the nonplanar, thermoplastic polymeric film has a thickness of from 50 to 500 microns.

5. The nonplanar, thermoplastic polymeric film of claim 1, wherein the peaks extend in an alternating fashion from the midline of the nonplanar thermoplastic polymeric film to an outer plane.

6. The nonplanar, thermoplastic polymeric film of claim 5, wherein the distance between the midline and the outer plane is from 50 to 1000 microns.

7. The nonplanar, thermoplastic polymeric film of claim 5, wherein the distance between the midline and the outer plane is from 100 to 500 microns.

8. The nonplanar, thermoplastic polymeric film of claim 1, wherein there are at least 2 peaks per linear centimeter of the nonplanar, thermoplastic polymeric film.

9. The nonplanar, thermoplastic polymeric film of claim 1, wherein there are at least 5 peaks per linear centimeter of the nonplanar, thermoplastic polymeric film.

10. The nonplanar, thermoplastic polymeric film of claim 1, wherein at least one polymer layer varies in thickness from thickest to thinnest zones by at least 10 percent.

11. The nonplanar, thermoplastic polymeric film of claim 1, wherein at least one polymer layer varies in thickness from thickest to thinnest zones by at least 50 percent.

12. The nonplanar, thermoplastic polymeric film of claim 1, wherein the nonplanar, thermoplastic polymeric film comprises at least a top polymer layer, a middle polymer layer, and a lower polymer layer.

13. The nonplanar, thermoplastic polymeric film of claim 12, wherein the middle layer is substantially constant in thickness across the width of the nonplanar, thermoplastic polymeric film.

14. The nonplanar, thermoplastic polymeric film of claim 12, wherein the nonplanar, thermoplastic polymeric film has no planar portions between the peaks and valleys.

* * * * *